(12) United States Patent
Gebraad et al.

(10) Patent No.: US 12,416,289 B2
(45) Date of Patent: Sep. 16, 2025

(54) CONTROL OF A WIND PARK WITH FLOATING TURBINES

(71) Applicant: Siemens Gamesa Renewable Energy A/S, Brande (DK)

(72) Inventors: Pieter M. O. Gebraad, København (DK); Kasper Laugesen, Esbjerg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/686,923

(22) PCT Filed: Aug. 17, 2022

(86) PCT No.: PCT/EP2022/072908
§ 371 (c)(1),
(2) Date: Feb. 27, 2024

(87) PCT Pub. No.: WO2023/030881
PCT Pub. Date: Mar. 9, 2023

(65) Prior Publication Data
US 2024/0426275 A1  Dec. 26, 2024

(30) Foreign Application Priority Data
Aug. 31, 2021  (EP) .................................... 21194066

(51) Int. Cl.
*F03D 7/04* (2006.01)
*F03D 13/25* (2016.01)

(52) U.S. Cl.
CPC ........... *F03D 7/049* (2023.08); *F03D 13/256* (2023.08); *F05B 2260/84* (2013.01); *F05B 2270/204* (2020.08); *F05B 2270/32* (2013.01)

(58) Field of Classification Search
CPC ........ F03D 7/049; F03D 7/048; F03D 13/256; F05B 2260/84; F05B 2270/204;
(Continued)

(56) References Cited

U.S. PATENT DOCUMENTS 7,357,622 B2 * 4/2008 Corten .................... F03B 15/06
416/198 R
9,382,900 B2 * 7/2016 Lee ......................... F03D 7/048
(Continued)

FOREIGN PATENT DOCUMENTS

DK        201470456 A1    5/2015
EP         2267297 A2 * 12/2010 ............. B63B 21/50
(Continued)

OTHER PUBLICATIONS

PCT International Search Report and Written Opinion of International Searching Authority mailed Nov. 9, 2022 corresponding to PCT International Application No. PCT/EP2022/072908 filed Aug. 17, 2022.
(Continued)

*Primary Examiner* — Nathaniel E Wiehe
*Assistant Examiner* — Wayne A Lambert

(57) ABSTRACT

A method of controlling wake in a floating wind park is provided. The method includes monitoring a wind condition at at least one of the plurality of floating wind turbines to generate at least a first monitored wind condition, monitoring one or more parameters indicative of a position and/or orientation of at least one of the plurality of floating wind turbines to generate at least a first monitored floating motion state and generating a control parameter based on a parameter set comprising at least the first monitored wind condition and the first monitored floating motion state. The control parameter is derived so as to reduce the wake influence on the downstream wind turbine. The method further includes controlling based on the control parameter, an operation of at least one of the plurality of floating wind turbines.

16 Claims, 6 Drawing Sheets

(58) Field of Classification Search
CPC .............. F05B 2270/32; F05B 2240/93; F05B 2240/95; Y02E 10/72
See application file for complete search history.

(56) References Cited

U.S. PATENT DOCUMENTS

| | | | |
|---|---|---|---|
| 9,617,975 B2* | 4/2017 | Attia | F03D 17/00 |
| 9,670,908 B2 | 6/2017 | Dupin De La Gueriviere | |
| 10,364,796 B2* | 7/2019 | Brath | F03D 7/043 |
| 10,883,474 B2* | 1/2021 | Geisler | F03D 7/045 |
| 2006/0131889 A1* | 6/2006 | Corten | F03D 13/20 |
| | | | 290/43 |
| 2009/0099702 A1* | 4/2009 | Vyas | F03D 7/0292 |
| | | | 290/55 |
| 2011/0074155 A1* | 3/2011 | Scholte-Wassink | B63B 35/44 |
| | | | 290/55 |
| 2015/0308416 A1* | 10/2015 | Ambekar | F03D 17/00 |
| | | | 700/287 |
| 2017/0328348 A1* | 11/2017 | Wilson | F03D 7/048 |
| 2018/0364651 A1* | 12/2018 | Onetto | G06F 17/40 |
| 2021/0115900 A1 | 4/2021 | Gebraad | |
| 2022/0282706 A1 | 9/2022 | Esbensen et al. | |
| 2022/0389906 A1* | 12/2022 | Shartzer | F03D 17/00 |
| 2023/0175490 A1* | 6/2023 | Altun | F03D 7/048 |
| | | | 416/1 |

FOREIGN PATENT DOCUMENTS

| | | | | |
|---|---|---|---|---|
| EP | 3517774 A1 * | 7/2019 | ............ | F03D 7/0292 |
| EP | 3739202 A1 * | 11/2020 | ............. | B63B 1/048 |
| EP | 3783221 A1 | 2/2021 | | |
| FR | 2996881 A1 * | 4/2014 | ............... | F03D 1/02 |
| WO | WO-2007009464 A1 * | 1/2007 | ............. | B63B 1/125 |
| WO | WO-2013110276 A1 * | 8/2013 | ............. | B63B 1/107 |
| WO | WO-2020057997 A1 * | 3/2020 | ............. | B63B 21/50 |

OTHER PUBLICATIONS

Kheirabadi, Ali C et al: "Modeling and Power Optimization of Floating Offshore Wind Farms with Yaw and Induction-based Turbine Repositioning"; 2019 American Control Conference (ACC), American Automatic Control Council; Jul. 10, 2019 (Jul. 10, 2019), pp. 5458-5463, XP033604966.

* cited by examiner

CONTROL OF A WIND PARK WITH FLOATING TURBINES

CROSS-REFERENCE TO RELATED APPLICATIONS

This application claims priority to PCT Application No. PCT/EP2022/072908, having a filing date of Aug. 17, 2022, which claims priority to European Application No. 21194066.3, having a filing date of Aug. 31, 2021, the entire contents all of which are hereby incorporated by reference.

FIELD OF TECHNOLOGY

The following relates to a method of controlling wake in a floating wind park. It further relates to a control system configured to perform such method.

BACKGROUND

Floating wind parks have the potential to significantly increase the sea area available for offshore wind parks since floating wind turbines can be arranged in areas where the implementation of bottom-fixed type wind turbines is not possible. Floating wind turbines are however exposed to wake effects, the dynamics of which are more complex due to the floating motion compared to those dynamics occurring in a wind park of the bottom-fixed type wind turbines. Thus, the wake effects can hardly be reduced by existing methods. In general, a wake effect occurs when rows in a wind park are closely aligned with the angle of the incoming wind. The front upstream wind turbines block the inflow and disturb the wind arriving at the downstream wind turbines. The wind is manipulated such that a reduced wind speed, known as a wind deficit, and an increased wind speed variation, known as wind turbulence, is caused. The downstream wind turbines are thus affected by more turbulent and less powerful wind. While the wind deficit is related to a decreased power production on park level, the wind turbulence is related to an increased load. The increased load is a consequence of the wind turbulence causing vibrations in a mechanical loading of the downstream wind turbines and results in higher wear and tear.

The document EP 3 783 221 A1 relates to a control system that repositions floating wind turbines in a wind park. However, repositioning floating wind turbines may require additional implementation effort since the wind turbines need to be navigable.

The document DK 2014 70456 A1 describes the dynamic positioning of multiple offshore wind turbines relative to each other. Information on a wake field is obtained by measuring wind conditions and using a model that estimates the wake field based on the geometric arrangement of wind turbines. At least two floating wind turbines are placed at positions at which the effect of the wake field is minimized.

SUMMARY

An aspect relates to a method of controlling wake in a floating wind park. The wind park comprises a plurality of floating wind turbines that can change their position and/or orientation during operation. The plurality of floating wind turbines comprise an upstream wind turbine and a downstream wind turbine, wherein the downstream wind turbine is positioned downstream of the upstream wind turbine such that a wake of the upstream turbine has an influence on the downstream wind turbine. In embodiments, the method comprises monitoring a wind condition at at least one of the plurality of floating wind turbines to generate at least a first monitored wind condition, monitoring one or more parameters indicative of a position and/or orientation of at least one of the plurality of floating wind turbines to generate at least a first monitored floating motion state and generating a control parameter based on a parameter set comprising at least the first monitored wind condition and the first monitored floating motion state. The control parameter is derived from the parameter set, wherein the deriving considers an influence of floating motion parameters of an upstream wind turbine on the wake of the upstream wind turbine and considers an effect of the wake of the upstream wind turbine on a downstream wind turbine. The control parameter is derived so as to reduce the wake influence on the downstream wind turbine. In embodiments, the method further comprises controlling, based on the control parameter, an operation of at least one of the plurality of floating wind turbines. The first monitored floating motion state may comprise parameters indicative of a floating motion of the at least one floating wind turbine.

As a result, the power production or performance on wind park level is increased. Simultaneously, wind turbulences are reduced and thus the load of each floating wind turbine and the wear and tear associated therewith is reduced. Further, basing the generation of the control parameter on the dynamic motions of the wind turbines may improve the efficiency and accuracy of the wake control. In particular, the motion of the floating wind turbine, such as an amplitude of a heave motion or of a rolling motion caused by swell, may significantly alter the wake of the floating wind turbine, e.g., due to wake meandering. This may result in a wider effective wake profile, but may also improve wake recovery rate, e.g., by creation of additional turbulences due to interaction with its own wake. Less control action to reduce the wake influence may thus be needed. By considering the motion state of the floating wind turbines, the wake control may thus be made more efficient, and the overall efficiency of the wind park may be improved.

The conventional art in contrast relies on the geometry of the arrangement of the wind turbines in the wind park, and the control performed by the conventional art repositions the wind turbines to minimize the wake influence (as for example described in EP 3 783 221 A1). As such geometric considerations are based on static absolute positions and rotation angles, the conventional art teaches away from using the floating motion states of wind turbines as a basis for wake control. In particular by using a center or average position, the conventional art processing removes all dynamic information and thus renders it impossible to make use of such information. The conventional art does also not teach how such floating motion states could possibly be handled in a wake optimization scheme, so that the skilled person would not have considered using respective dynamic motion states in the conventional art control methods for repositioning floating wind turbines.

Monitoring may for example be performed—but is not limited to—by at least one of a sensor, a sensoring system and a model or a filter-based monitoring system, which may for example be a state observer, Kalman filter or the like. Monitoring may further comprise signal pre- and post-processing, e.g., filtering.

Monitoring may comprise estimating at least the first monitored wind condition and/or at least the first monitored floating motion state. In an embodiment, estimating is based on a measured input and the method further comprises measuring (by a sensor unit) the measured input.

Monitoring the wind condition at at least one of the plurality of floating wind turbines may comprise measuring the wind condition at at least one of the plurality of floating wind turbines and/or monitoring one or more parameters indicative of a position and/or orientation of at least one of the plurality of floating wind turbines may comprise measuring one or more parameters indicative of a position and/or orientation of at least one of the plurality of floating wind turbines.

It should be clear that reducing the wake influence on at least one floating wind turbine increases the overall performance/power production of the wind park. It may be possible that the performance of some wind turbines (e.g., upstream wind turbines) could be reduced in order to reduce wake influence on other wind turbines (e.g., downstream wind turbines). That may for example be achieved by applying a yaw offset and/or a blade pitch offset. It may also be possible that the wake influence on a subset of the plurality of floating wind turbines may be increased in order to reduce the wake influence on others that are not comprised by the subset. However, the wake influence on at least one floating wind turbine of the wind park can be reduced to increase the performance of the wind park. Correspondingly, the wake influence on at least one floating wind turbine of the wind park can be reduced in order to reduce the load on wind park level due to the wake induced wind turbulences. Accordingly, it should be clear that the control parameter may comprise a plurality of control parameters each of which is associated with and executed by one of the wind turbines of the wind park. However, the number of control parameters comprised by the plurality may not be equal to the number of wind turbines.

According to an embodiment, the at least one floating wind turbine for which the first monitored floating motion state is generated is the upstream wind turbine and the at least one wind turbine for which the first monitored wind condition is generated is the upstream wind turbine. In embodiments, the method further comprises monitoring a second floating motion state and a second wind condition at the downstream wind turbine in order to generate a second monitored floating motion state and a second monitored wind condition. The second monitored floating motion state and the second monitored wind condition are comprised by the parameter set.

The floating motion parameters may be comprised by the first monitored floating motion state.

In embodiments, the method may further comprise monitoring the wind condition and the floating motion state for each of the plurality of floating wind turbines to generate respective monitored wind conditions and respective monitored floating motion states. The respective monitored wind conditions and the respective floating motion states may be comprised by the parameter set.

Monitoring the wind condition and the floating motion at a plurality of the floating wind turbines increases the level of detail of the distribution of the wind conditions in the wind park and thus increases the efficiency of wake reduction.

In an embodiment, monitoring the wind condition and the floating motion state may be performed only for such floating wind turbines which are in operation. For example, the wind condition and the floating motion state may not be monitored or be monitored in a limited way for such floating wind turbines that are in curtailment or out of operation.

According to an embodiment, monitoring the wind condition comprises monitoring one or more wind parameters that are representative of at least one of an inflow wind direction, a wind turbulence and a wind speed.

Each wind turbine may comprise a floating foundation on which the respective wind turbine is mounted. The floating foundation may move. The motion of the floating foundation and the respective floating wind turbine may be divided into six individual degrees of freedom, namely three translations including a surge, a sway and a heave, and three rotations, namely a roll, a pitch and a yaw: The translational motions may herein be referred to as floater surge motion, floater sway motion and floater heave motion and the angular motions may herein be referred to as floater roll motion, floater pitch motion and floater yaw motion. A translation covered by one of the translational floater motions may correspondingly be referred herein to as floater surge, floater sway and floater heave, and an angle of rotation covered by one of the angular floater motions may correspondingly be referred to as floater roll angle, floater pitch angle and floater yaw angle. A displacement of a floating wind turbine may be composed by one or more of the translations and an inclination of a floating wind turbine may be composed by one or more of the rotations. The floating wind turbine may comprise a nacelle, wherein the nacelle may be rotated by control specific angular motions. In particular, it may be rotated by a rotational angle covered by the control specific angular motions, wherein the rotational angle may be a nacelle yaw angle and/or a nacelle tilt angle covered by an angular motion of the nacelle of the floating wind turbine around a respective yaw and tilt axis. The floating wind turbine may further comprise a rotor comprising a rotor blade. Additionally, or alternatively, the control specific angular motions may comprise a parameter that is related to a rotation of the rotor blade of the floating wind turbine around a longitudinal axis of the rotor blade. e.g., a blade pitch (angle). The rotation of the at least one rotor blade. i.e., the blade pitch angle, may be comprised by the wind turbine's controlled degrees of freedom. The rotor blade may thus be moved by the control specific angular motions.

According to an embodiment, monitoring the floating motion state comprises monitoring one or more motion parameters that are representative of a translational motion in at least one direction and/or an angular motion about at least one angle of rotation, wherein the at least one direction is selected from a floater surge direction, a floater sway direction and a floater heave direction, and wherein the at least one angle is selected from a floater yaw angle, a floater roll angle and a floater pitch angle.

According to an embodiment, monitoring the floating motion state comprises monitoring one or more motion parameters that are representative of a translational motion in at least one direction and/or an angular motion about at least one angle of rotation, which is selected from a floater yaw angle, a floater roll angle and a floater pitch angle. In embodiments, the method further comprises determining based on the one or more motion parameters at least on of an amplitude of the motion, a frequency of the motion, a displacement and/or inclination of the floating wind turbine.

The amplitude and/or frequency of a monitored parameter may for example be determined based on a frequency spectrum or its respective amplitude and phase spectrum, the frequency spectrum or its respective amplitude and phase spectrum being derived from a time series of the monitored parameter. It may for example be derived by applying a fast Fourier transform to the time series.

As an example, the monitored floating motion state may be indicative of a dynamic motion of the at least one wind turbine. The monitored floating motion state may comprise an amplitude and/or a frequency of a translational motion and/or an angular motion (e.g., in one or more of the above-mentioned directions/angles) of the at least one wind turbine. The amplitude and/or frequency may be derived from a respective time series of the one or more monitored parameters. The motion may be an (approximately) periodic motion, such as the up and down motion in the heave direction, or the periodic rolling motion about the floater roll angle. From a respective time series of the respective position/angle, the amplitude and/or frequency may be derived. The wake effects due to dynamic motion of the wind turbines (such as wake meandering that results in a wider effective wake) may thus be considered, which may lead to an improved operation of the wind park.

The one or more parameters indicative of a position and/or orientation of at least one of the pluralities of floating wind turbines may be monitored over a time period to obtain a respective time series of the one or more parameters. In some examples, the first monitored floating motion state may comprise a parameter that is indicative of a derivative of the one or more parameters over time or that is indicative of a change of the one or more parameters over time.

In an embodiment, determining the displacement and/or the inclination of the floating wind turbine comprises monitoring a data series over time of at least one of the inclination and the displacement of the floating wind turbine, and averaging the respective data series in order to generate at least one of a mean inclination and a mean displacement.

In an embodiment, the averaging is performed by low-pass filtering. According to an embodiment, the method further comprises monitoring an operational state of at least one of the plurality of floating wind turbines to generate at least a first monitored operational state. The monitored operational state is further comprised by the parameter set.

The operational state may comprise one or more parameters that are representative of the operation state of at least one floating wind turbine, e.g., actual control values which may be representative of the nacelle yaw: blade pitch or nacelle tilt angle, or a parameter that is representative of a floating wind turbine being in/out of operation or in curtailment. It may further comprise a motion parameter of the rotor or the nacelle, or a parameter related to the power generation of the at least one floating wind turbine. It may further comprise site-specific information. e.g., parameters that are representative of a layout of the wind park.

The at least one floating wind turbine for which the first monitored operational state is generated may be the upstream wind turbine. In embodiments, the method may further comprise monitoring a second operational state at the downstream wind turbine to generate a second monitored operational state. The second monitored operational state may be comprised by the parameter set.

In embodiments, the method may further comprise monitoring the operational state for each of the plurality of floating wind turbines to generate respective monitored operational states. The respective monitored operational states may be comprised by the parameter set.

The operational state of the floating wind turbines may for example be taken into account for generating a control parameter of minimal manipulation effort. i.e., desiring such control parameter which minimizes the total manipulation effort on wind park level derived from a manipulation effort required for each floating wind turbine when the control parameter is executed. Such minimal effort control parameter would thus minimize the required power for executing the control parameter and thus further increase the efficiency at park level.

According to an embodiment, the parameter set is reduced to a reduced parameter set. The parameters of the reduced parameter set have a greater influence on a performance of the wind park than at least one parameter that is not comprised by the reduced parameter set. In an embodiment, the control parameter is generated based on the reduced parameter set. Reducing the parameter set may form part of the method or the method may operate with a predetermined reduced parameter set. i.e., only the parameters of the reduced set are monitored or derived.

Such parameter reduction reduces the parameter set to the most relevant parameters and thus reduces the computation effort required for generating the control parameter.

According to an embodiment, the deriving of the control parameter from the parameter set is performed by a look-up table and/or a wind park wake model.

The look-up table and/or wind park wake model may return the control parameter based on the input parameter set. The look-up table may comprise a plurality of control parameters which may for example be obtained based on empirical data. The wind park wake model may for example be a simulation model simulating the wake influence in the wind park based on thermodynamics and/or fluid mechanics.

The look-up table and/or the wind park wake model allow a fast and reliable generating of the control parameter.

According to an embodiment, the look-up table is a predetermined look-up table obtained based on a wind park wake model. The look-up table is configured to provide for each composition of the parameter set a control parameter that minimizes the wake influence in the wind park for the respective parameter set. The look-up table may alternatively be configured to provide for each composition of the parameter set a control parameter that maximizes the performance of the wind park for the respective parameter set, minimizes the turbulence experienced by downstream wind turbines or both (e.g., using a weighted average that is optimized).

The look-up table may comprise a plurality of look-up tables, each of which is associated with one of the plurality of floating wind turbines.

Alternatively, or additionally, the look-up table may comprise a plurality of look-up tables and the parameter set may comprise a first and second portion of parameters. In embodiments, the method may further comprise preselecting a selected look-up table of the plurality of look-up tables based on the first portion of the parameter set. The control parameter may be generated based on the second portion of the parameter set and the selected look-up table.

For example, a look-up table may be selected from a subset of the plurality of look-up tables based on the floating motion state and the wind turbulence. The subset may comprise a plurality of look-up tables associated with one of the plurality of wind turbines of the wind park. The control parameter may be derived based on the wind direction, wind speed, blade pitch and nacelle yaw that is input to the selected look-up table.

Such cascaded look-up tables allow for a simpler and clearer data structure which can therefore be maintained with less effort.

According to an embodiment, generating the control parameter is based on the look-up table and the method further comprises approximating the control parameter if a parameter of the parameter set that is input to the look-up table comprises an intermediate value between two predefined values of the lookup table. In an embodiment, the approximating comprises applying an interpolation and applying a multivariate interpolation.

According to an embodiment, generating the control parameter is based on the look-up table and the parameter set comprises an uncertainty affected parameter comprising an actual value that is affected by a parameter uncertainty. The look-up-table has been generated based on the wind park wake model such that a control parameter is generated that maximizes an expected value of the performance of the floating wind park when assuming a range of possible values for the uncertainty affected parameter based on the actual value of the parameter and a parameter that is representative of the parameter uncertainty.

Such a generated look-up table allows the method to deal with parameters of the parameter set that can hardly be measured. i.e., the measurements of which are uncertainty affected, or cannot be measured. The look-up table still robustly provides a control parameter in response to an uncertainty affected input. Such robust look-up table may be generated offline. e.g., before a startup of a respective floating wind turbine. However, it may also be possible that the look-up table is iteratively updated during the operation of the respective floating wind turbine.

According to an embodiment, generating the control parameter is based on the wind park wake model and the wind park wake model is configured to provide for each composition of the parameter set a control parameter that maximizes wind park performance by reducing the wake influence in the wind park for the respective parameter set. In particular, the wake influence may be reduced so as to maximize the performance (e.g., power production) of the wind park and/or so as to reduce loads on the wind turbines. The wind park wake model may hence be configured to provide for each composition of the parameter set a control parameter that maximizes the performance of the wind park and/or reduce loads on the wind turbines for the respective parameter set.

According to an embodiment, generating the control parameter is performed iteratively, in particular every half minute up to every 10 minutes, and even more particular every 2 minutes.

According to an embodiment, generating the control parameter is based on the wind park wake model and the parameter set comprises at least an uncertainty affected parameter comprising an actual value that is affected by a parameter uncertainty. In embodiments, the method further comprises deriving a range of possible values for the uncertainty affected parameter based on the actual value of the parameter and a parameter that is representative of the parameter uncertainty. The control parameter is generated based on the range such that the control parameter maximizes an expected value of the overall performance of the wind park.

According to an embodiment, the floating motion state comprises at least one of a floater heave amplitude, a floater heave displacement, a floater surge amplitude, a floater surge displacement, a floater sway amplitude, a floater sway displacement, a floater roll amplitude, a floater roll inclination, a floater pitch amplitude, a floater pitch inclination, a floater yaw amplitude, a floater yaw inclination. The floating motion state may comprise both static positions and dynamic motions of a floating wind turbine in the direction of at least one of the floater heave, floater surge and floater sway axis or rotating around at least one of the floater heave, floater surge and floater sway axis. In other words, the floating motion state may comprise one or more parameters that are indicative of the dynamic motions of the at least one floating wind turbine, in particular indicative of one or more translational and/or rotational motions, for example of at least one or two (e.g., three) translational motions and at least one or two (e.g. three) rotational motions of the at least one floating wind turbine.

According to an embodiment, the control parameter comprises at least a command to adjust at least one of a blade pitch of the floating wind turbine to be manipulated, a rotor speed of the floating wind turbine to be manipulated, a nacelle yaw angle of the floating wind turbine to be manipulated, and a nacelle tilt angle of the floating wind turbine to be manipulated. The floating wind turbine to be manipulated may comprise a rotor and, additionally or alternatively, the control parameter comprises at least a command to apply at least one of a tilt moment on the rotor and a yaw moment on the rotor. The floating wind turbine to be manipulated is positioned at a location and, additionally or alternatively, the control parameter comprises a command to reposition the location of the floating wind turbine to be manipulated.

In an example, the wind turbine (e.g., upstream wind turbine) may remain at its location, and controlling the operation on the basis of the control parameter may include (directly) controlling at least one of a direction of the wake at this location, a strength of the wake at this location and a distance of the wake along which the wake is effective at this location. This may occur by changing an operation state of the (upstream) wind turbine, in particular while maintaining the position and/or orientation of the wind turbine (in particular of its floating foundation). The position and/or orientation of the wind turbine (e.g., its floating foundation) may for example be maintained (at least substantially) by a mooring system. Changing the operation state to steer the wake may for example comprise changing a yaw offset of the wind turbine.

An interface may be provided which allows applying the generated control parameter which may be a parameter offset or a parameter correction factor, e.g., a nacelle yaw offset or nacelle yaw correction factor, to a control architecture that already exists. For example, the nacelle yaw offset may be added to a nacelle yaw reference value of a respective nacelle yaw control to modify the nacelle yaw reference value of a wind turbine. Correspondingly, the nacelle yaw correction factor may be multiplied with the nacelle yaw reference value in order to modify the nacelle yaw reference value.

This allows a simple integration of the method into the current control architecture of wind parks. In particular, it is easily possible to retrofit wind parks that are already erected.

According to an embodiment, the method further comprises data binning at least a portion of the parameter set, wherein a result of the data binning is comprised by the parameter set. In an embodiment, the data binning comprises at least one of mapping the monitored floating motion state onto a floating motion state bin range, and mapping the monitored wind condition onto a wind condition bin range.

Data binning a parameter of the parameter set reduces a resolution of the parameter and thus data binning a portion of the parameter set reduces the computation effort that is required for generating the control parameter.

It should be clear that in case of a multi-dimensional data representation, a multi-dimensional data binning is performed. Further, it should be clear that data binning may also be performed for a single parameter, or a combination of parameters comprised by the parameter set and in particular for parameters of the floating motion state or of the wind condition. e.g., for a floater pitch, a floater yaw, a floater sway amplitude, or a wind turbulence intensity.

According to an embodiment of the invention, a control system for controlling wake in a floating wind park is provided. The wind park comprises a plurality of floating wind turbines that can change their position and/or orientation during operation, the plurality of floating wind turbines comprising an upstream wind turbine and a downstream wind turbine. The downstream wind turbine is positioned downstream of the upstream wind turbine such that a wake of the upstream turbine has an influence on the downstream wind turbine. The control system comprises a processing unit configured to perform any of the methods described herein.

The control system may further comprise a first monitoring unit configured to monitor a wind condition at least at one of the plurality of floating wind turbines to generate at least a first monitored wind condition and a second monitoring unit configured to monitor a floating motion state at least at one of the plurality of floating wind turbines to generate at least a first monitored floating motion state.

The control system may for example include the processing unit and a memory, the memory storing control instructions which when executed by the processing unit of the control system, cause the control system to perform any of the methods described herein. The processing unit may for example include a digital signal processor, an application specific integrated circuit, a field programmable gate array, a microprocessor or the like.

The memory may include RAM. ROM. Flash Memory, a hard disk drive and the like.

The control system may comprise a plurality of control systems and a master control system, wherein each of the plurality of control systems may be communicatively coupled with or comprised in one of the plurality of floating wind turbines and further communicatively coupled with the master control system. Each of the plurality of control systems and the master control system may comprise a processing unit and a memory unit. The control system may be configured to perform any of the methods described herein, wherein steps of the method may be performed distributed over the plurality of control systems and the master control system.

According to an embodiment of the invention a computer program product (non-transitory computer readable storage medium having instructions, which when executed by a processor, perform actions) for controlling wake in a floating wind park is provided, wherein the computer program comprises control instructions which, when executed by a processing unit, cause the processing unit to perform any of the methods described herein. The computer program may be provided on a volatile or non-volatile storage medium or data carrier.

According to an embodiment of the invention, a wind park is provided, wherein the wind park comprises a plurality of floating wind turbines and any of the control systems described herein.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with references to the following Figures, wherein like designations denote like members, wherein.

DETAILED DESCRIPTION

Figure 1:
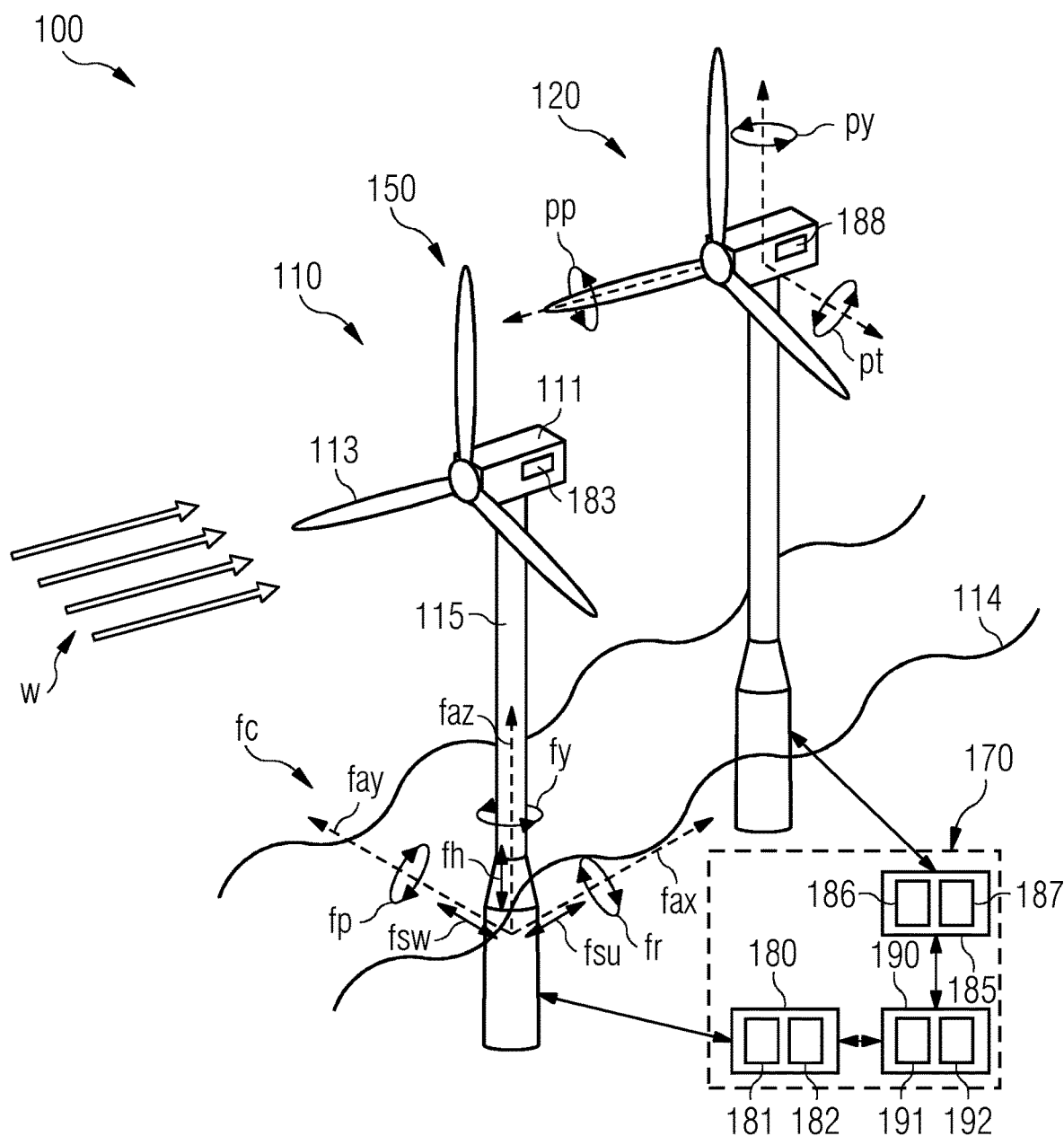
FIG. 1 is a schematic drawing illustrating a control system controlling a first and a second floating wind turbine according to an embodiment.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a." "an," and "the" are intended to include the plural forms as well, unless the context clearly indicates otherwise. The terms "comprising." "having." "including," and "containing" are to be construed as open-ended terms (i.e., meaning "including, but not limited to,") unless otherwise noted.

A floating wind turbine may herein be referred to as only 'wind turbine' or even only 'turbine', unless otherwise noted or otherwise indicated by the context.

It should be clear that descriptions and explanations herein which are limited to specific wind turbines may be applied to other/all wind turbines of a wind park comprising the specific wind turbines, even if such other/all wind turbines are not shown in the respective figure.

FIG. 1 is a schematic drawing illustrating a control system 170 controlling a first floating wind turbine 110 and a second floating wind turbine 120 according to an embodiment. Both the first and the second wind turbines may be comprised by a plurality of floating wind turbines of a floating wind park 100. The wind turbines float in a fluid 114, e.g., water, which may have waves spreading in a specific direction. The first wind turbine 110 is positioned in wind direction upstream of the second wind turbine 120 such that a wake of the first wind turbine 110 has an influence on the second wind turbine 120. The second wind turbine 120 is positioned downstream of the first wind turbine 110 following a direction of an incoming wind w. The first wind turbine 110 may thus be referred to as upstream wind turbine 110 and the second wind turbine may be referred to as downstream wind turbine 120. The upstream wind turbine 110 blocks the incoming wind w and manipulates the wind arriving at the downstream wind turbine 120.

Each of the wind turbines comprises a nacelle 111, a rotor 150 having rotor blades 113, a tower 115 and a monitoring unit 183, 184. Each monitoring unit 183, 188 may monitor a wind condition at the respective wind turbine 110, 120. The wind condition may be measured e.g., by an aerometer or partially or fully derived based on software. e.g., obtained via a communication connection. The wind condition may exemplarily comprise a wind speed, direction or turbulence. Each monitoring unit 183, 188 may monitor a floating motion state of the respective wind turbine 110, 120. It should be clear that such monitoring unit may be an external device that may be integrated into the existing topology of the wind park and/or a unit that is implemented in the existing control architecture (e.g., a software unit) and that may use the existing devices of the topology. The floating motion state may comprise parameters representative of a floating motion of a wind turbine in a direction of at least one of six degrees of freedom of the respective wind turbine. For example, the floating motion may be defined by three translational and three rotational/angular motions in a fixed Cartesian three-dimensional coordinate system fc. The floating motion state may further comprise a position/orientation (pose) of the respective wind turbine in the coordinate system fc. Other representations for the floating motion state may be used. The monitoring may be performed by suitable sensors. Based on the measurements an inclination and a displacement, and/or a frequency and amplitude of the motion of the turbine in each of the six degrees of freedom may be derived. For example, monitoring the floating motion state may comprise measuring motions by gyroscopes and accelerometers and measuring displacements by GPS. Other sensors may be used. Further, the monitoring may include any required pre- or post-processing steps of a generated signal. For example, the frequency or amplitude of a signal may be derived by applying a fast Fourier transform on the signal. Relevant amplitudes, frequencies or phases may then be selected from the spectrum. It should be clear that the monitoring unit may be partially or fully implemented in software. For example, such parameters which can hardly or not be measured may be estimated. e.g., by a Kalman filter or a state observer. The coordinate system fc is in the following also referred to as floater coordinate system fc and motions therein are addressed by a prefix 'floater' in order to provide a clear distinction over control specific motions which may be addressed by a prefix 'nacelle' or 'blade'. The control specific motions are for example a nacelle yaw motion py which represents a rotation of the nacelle around a longitudinal axis of the tower 115, a nacelle tilt motion pt which represents a rotation of the nacelle perpendicular to the yaw motion py and a blade pitch motion pp which represents a rotation of at least one of the rotor blades 113 around a longitudinal axis of the respective rotor blade 113. A rotational angle covered by the control specific rotational motion is correspondingly a nacelle yaw angle, a nacelle tilt angle or a blade pitch angle. Please note that the blade pitch relates to a pitch of a rotor blade, i.e., the blade pitch relates to a rotation of the rotor blade 113 around the longitudinal axis of the rotor blade 113, i.e., the blade pitch angle is a rotor blade pitch angle. An exemplary positioning of the coordinate system fc is depicted in FIG. 1 for the wind turbine 110. For the other wind turbines, it may be positioned correspondingly. A z axis faz shows in a direction that points parallel to a longitudinal axis of the tower 115 of the wind turbine 110, a x axis fax shows in a direction that points towards the second wind turbine 120, and the y axis fay is perpendicular to both the x axis fax and the z axis faz. A wind turbine's position and orientation due to a floating motion thereof may be represented relative to the coordinate system fc, e.g., by a pose (orientation and position).

In the following, a motion of a floating wind turbine is a floater heave motion fh if the wind turbine floats translationally in the direction of the z axis faz, a floater yaw motion fy if the wind turbine rotates around the z axis faz, a floater surge motion fsu if the wind turbine floats translationally in the direction of the x axis fax, a floater roll motion fr if the wind turbine rotates around the x axis fax, a floater sway motion fsw if the wind turbine floats translationally in the direction the y axis fay, and a floater pitch motion if the wind turbine rotates around the y axis fay. The inclination of the wind turbine may thus be based on an angle covered by at least one of the floater roll motion fr, pitch motion fp and yaw motion fy. The displacement of the wind turbine may thus be based on a distance covered by at least one of the floater heave motion fh, floater surge motion fsu and floater sway motion fsw.

The floating wind park 100 is controlled by a control system 170. The control system 170 is communicatively coupled to each wind turbine of the floating wind park 100 in order to receive and provide data. For example, the control system 170 receives for each wind turbine the monitored floating motion state and the monitored wind condition both of which monitored at the respective wind turbine. The control system 170 may provide to each wind turbine a control parameter according to which an operation state of the respective wind turbine may be changed, e.g., a nacelle yaw offset/correction factor changing the nacelle yaw reference value of a respective nacelle yaw control. The control system 170 derives such control parameter at least based on the received data such that the wake influence is reduced and, accordingly, such that the performance of the wind park 100 is increased.

According to an embodiment, the control system 170 comprises a wind turbine controller 180 communicatively coupled to, comprised in, the upstream wind turbine 110, the wind turbine controller 180 comprising a memory unit 182 and a processing unit 181. The control system 170 further comprises a wind turbine controller 185 communicatively coupled to, comprised in, the downstream wind turbine 120, the wind turbine controller 185 comprising a memory unit 187 and a processing unit 186. Both the wind turbine controller 180 and the wind turbine controller 185 are communicatively coupled to a wind park controller 190, the wind park controller 190 comprising a memory unit 192 and a processing unit 191. The wind turbine controllers 180, 190 generate the monitored wind condition and the monitored floating motion state for the respective wind turbine in which they are arranged and provide the generated data to the wind park controller 190. The wind park controller 190 derives the control parameter for each wind turbine based on the received data and provides the control parameter to the respective wind turbine controller.

According to an embodiment, the monitored floating motion state and the monitored wind condition are comprised by a parameter set. The control parameter is derived from the parameter set and the deriving considers an influence of floating motion parameters of an upstream and/or downstream wind turbine on the wake of the upstream wind turbine arriving at the downstream wind turbine. More specifically, the control parameter is derived such that consider the effect of the monitored floating motion state on wake deflection, initial velocity deficit and velocity deficit recovery. FIGS. 2-6 show exemplary motions of floating wind turbines which may be induced by wind or waves and that affect the wake influence. The control parameter for each wind turbine is hence adjusted according to the motion of the floating wind turbines.

Figure 2:
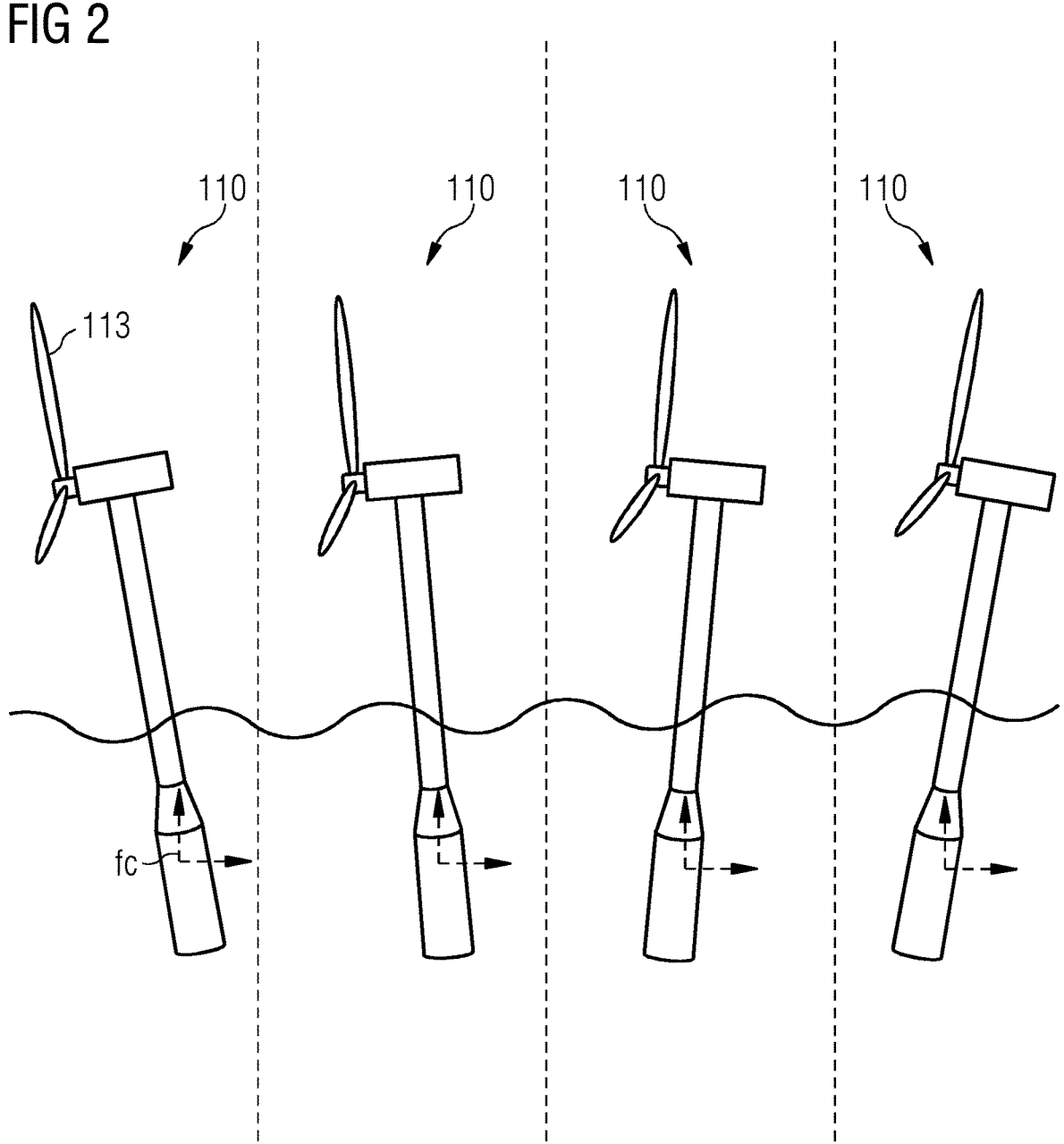
FIG. 2 is a schematic drawing illustrating states of a floater pitch motion of a floating wind turbine over time.

FIG. 2 shows a schematic drawing illustrating states of a floater pitch motion of the floating wind turbine 110 over time. The wind turbine 110 rotates around the floater pitch axis of the coordinate system fc. As the rotor blade 113 begins to move backwards with the floater pitch motion, it interacts with its own wake which leads to a development of a turbulence region with circulations in the flow. The turbulence increases the wake recovery rate as it flows downstream. A higher floater pitch amplitude of an upstream turbine enhances thus the wake recovery due to the resulting large-scale turbulence mixing the wake flow with ambient flow. The effective wind speed deficit experienced by the downstream turbine is accordingly reduced.

Figure 3:
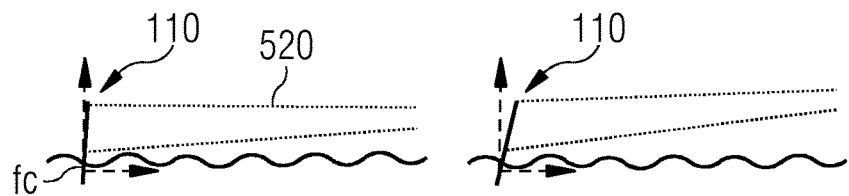
FIG. 3 is a schematic drawing illustrating an influence of a floater pitch inclination of a floating wind turbine on a wake deflection.

FIG. 3 shows a schematic drawing illustrating an influence of a floater pitch inclination of the floating wind turbine 110 on a wake deflection. The floater pitch inclination due to a floater pitch motion in the coordinate system fc of the floating turbine can cause a wake deflection in a vertical direction. In the right-handed part of FIG. 3 the floater pitch angle is greater than in the left-handed part of FIG. 3. Accordingly, a wake 520 of the upstream wind turbine is deflected vertically in the right-handed part of FIG. 3. The vertical wake deflection changes the wake that overlaps with a downstream turbine and may thus reduce/increase the wake influence on the downstream wind turbine. Similarly, a lateral (horizontal) wake deflection is caused by any wind- or wave-induced floater yaw inclination or rotation of the floating turbine due to a floater yaw motion. The floater yaw inclination results in a horizontal wake deflection that changes the wake that overlaps with a downstream turbine may thus reduce/increase the wake influence on the downstream wind turbine.

Figure 4:
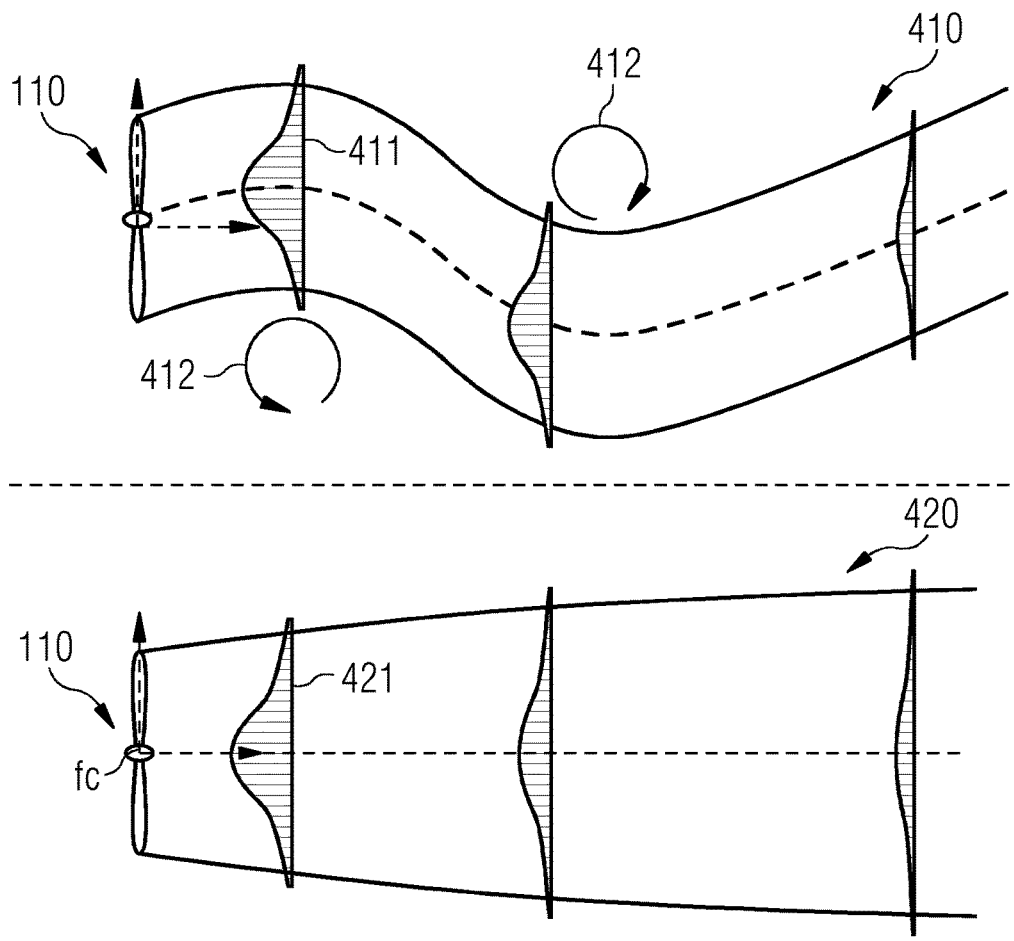
FIG. 4 is a schematic drawing illustrating a wake meandering effect of a floating wind turbine.

FIG. 4 shows a schematic drawing illustrating a wake meandering effect of the floating wind turbine 110. The upper part of the figure shows an instantaneous wake meandering effect, and the lower part of the figure shows a time-averaged wake meandering effect. A comparison of the instantaneous wake profile 410 with the time-averaged wake profile 420 shows that the time-averaged wake meandering effect appears as a wider wake with a respective larger velocity deficit indicated by a velocity deficit distribution 421. In general, the wake meandering effect is related to atmospheric eddies 412 but it may be increased due to the floating motion of the turbine 110. For example, a floater heave motion, a floater sway motion and a floater roll motion may increase a vertical wake meandering effect and a horizontal wake meandering effect. Thus, the effective wake spread may be wider in case of a higher amplitude of the floater heave motion, floater sway motion and floater roll motion. The effective wind speed deficit experienced by the downstream turbine may be lower but is experienced for a larger range of wind directions.

Figure 5:
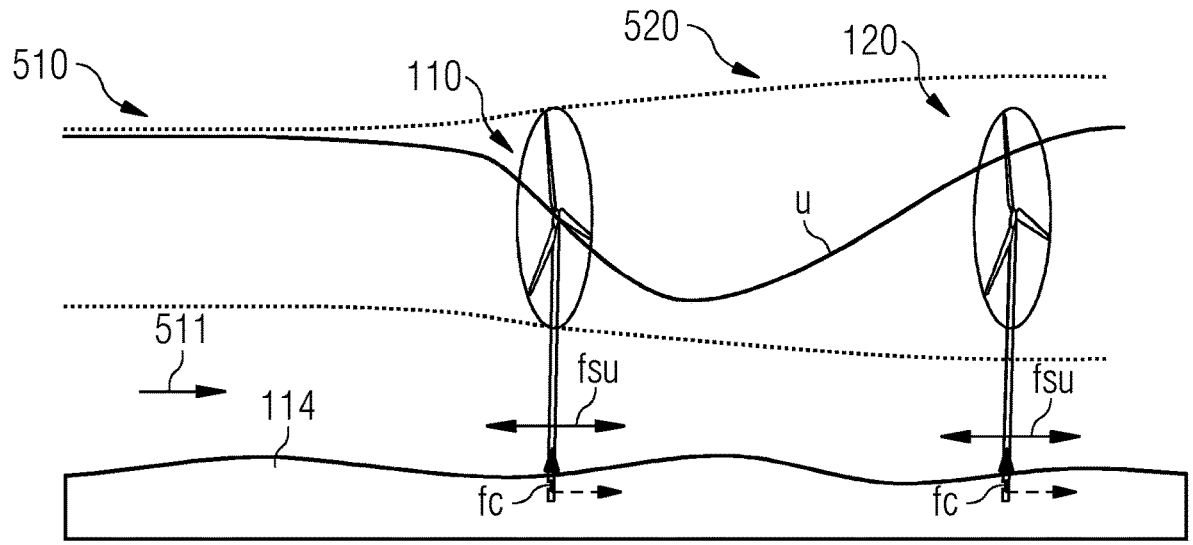
FIG. 5 is a schematic drawing illustrating an influence of a floater surge motion of an upstream and a downstream wind turbine on the downstream wind turbine.

FIG. 5 shows a schematic drawing illustrating an influence of a floater surge motion fsu of the upstream wind turbine 110 and the downstream wind turbine 120 on the downstream wind turbine 120. The graph of wind velocity u indicates a magnitude of wind velocity u at different positions along a wind direction arrow 511. By following the graph, it can be seen that the effective wind velocity that arrives at the downstream wind turbine 120 decreases if the relative distance between the upstream wind turbine 110 and downstream wind turbine 120 is decreased and increases if the relative distance is increased. Thus, the effect of wake 520 of the upstream wind turbine 110 on the downstream wind turbine 120 depends on their relative distance from each other which is affected by the floater surge motion fsu.

Figure 6:
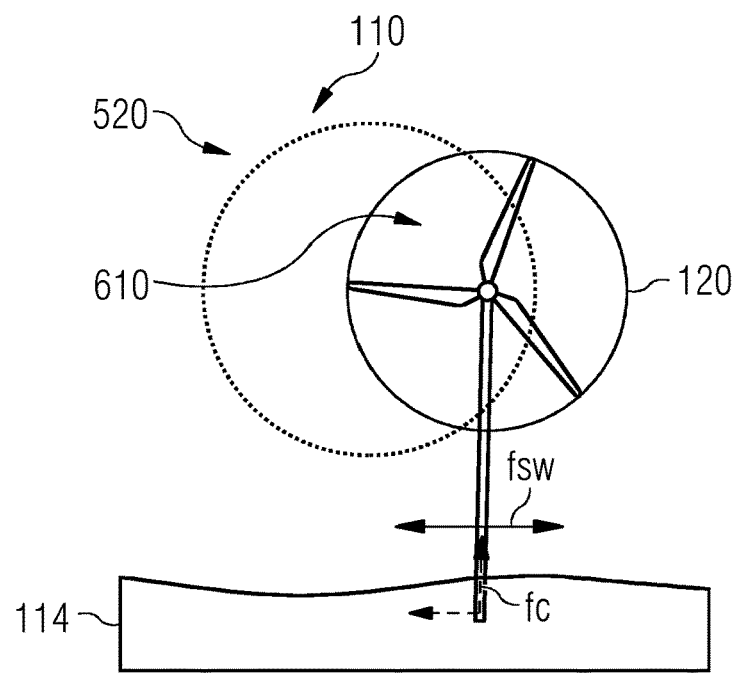
FIG. 6 is a schematic drawing illustrating an influence of a floater sway motion of an upstream and a downstream wind turbine on the downstream wind turbine.

FIG. 6 shows a schematic drawing illustrating an influence of a floater sway motion fsw of the upstream wind turbine 110 and the downstream wind turbine 120 on the downstream wind turbine 120. The floater sway displacement due to the floater sway motion fsw changes the wake 520 that overlaps with the downstream turbine 120 (area of wake overlap 610) and thus reduces/increases the wake influence thereon. It should be clear that the same effect occurs for the floater heave motion.

Figure 7:
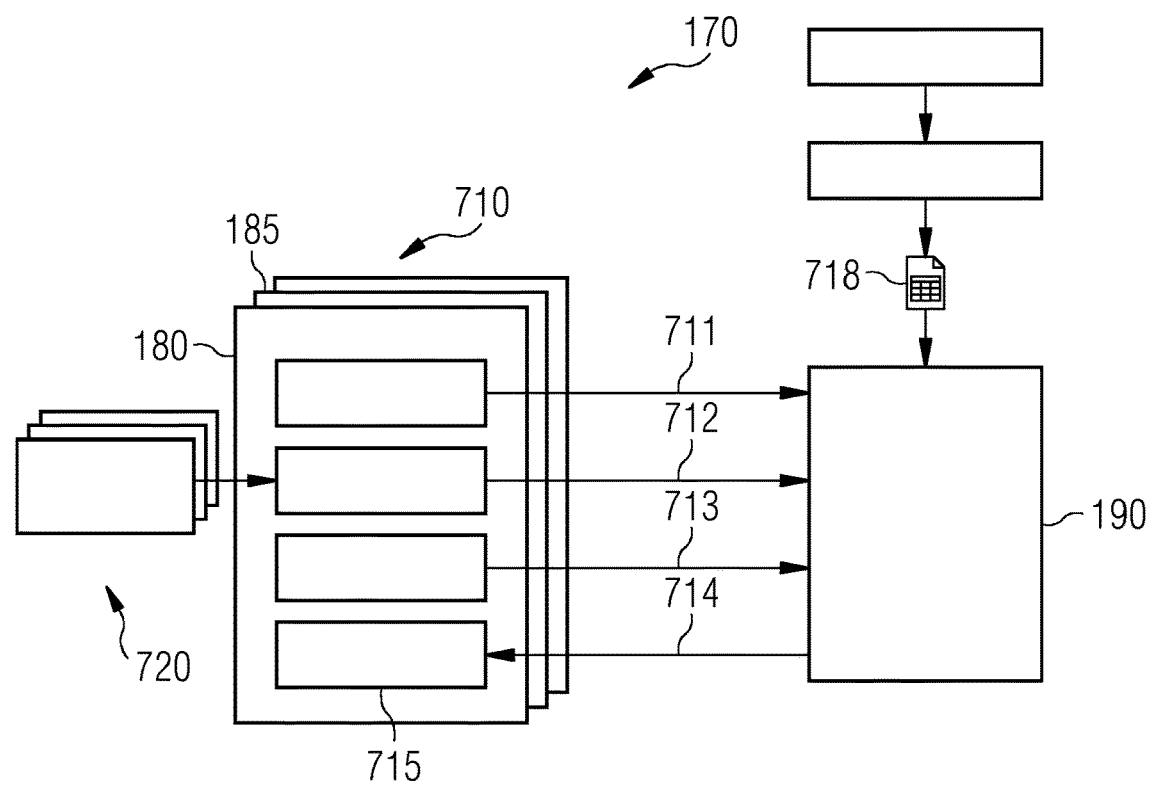
FIG. 7 is a schematic drawing showing a control system and a signal flow illustrating an operation of controlling wake according to an embodiment.

FIG. 7 is a schematic drawing showing the control system 170 and a signal flow chart illustrating an operation of controlling wake according to an embodiment. The control system 170 comprises the wind park controller 190 and a plurality of wind turbine controllers 710 comprising the wind turbine controllers 180, 185. Each of the wind turbine controllers controls a wind turbine of the wind park. Further, each of the wind turbines comprises floating wind turbine motion sensors, e.g., gyros, accelerometers and GPS sensors by which a monitored floating motion state is generated for each wind turbine. The floating wind turbine motion sensors of the wind turbines are comprised by a plurality of floating wind turbine motion sensors 720. The data measured by the floating turbine motion sensors of each wind turbine is provided to the respective wind turbine controller. Each controller generates the monitored floating motion state of the respective wind turbine based on the received data. For example, the monitored floating motion state may be estimated based on the received data. The monitored floating motion state 712 of each wind turbine is then provided to the wind park controller 190. Further, for each of the wind turbines, a monitored wind condition 711 is provided to the wind park controller 190. The monitored wind condition 711 may be data measured by a weather station that may be further processed. The processing may include an estimation of the monitored wind condition based on the measured data.

The wind park controller 190 may further receive a monitored operational state 713 of each wind turbine. The operational state may for example comprise data indicative for the actual operation activity of a respective wind turbine. In an embodiment, the monitored operational state may be generated based on existing functionality of the wind turbines. The operational state may further comprise values related to the existing control architectures of the wind turbine, e.g., values related to the nacelle yaw, blade pitch or nacelle tilt control. A control parameter 714 for each wind turbine is derived based on the received data by the wind park controller 190 and provided to the respective wind turbine controller. In response, each wind turbine controller controls the respective wind turbine according to the control parameter. The control parameter 714 may be derived based on a look-up table 718 which includes optimized control parameters for each wind turbine for each possible combination of the monitored wind condition 711 and the monitored floating motion state 712 monitored at each wind turbine. More specifically, the look-up table takes the monitored floating motion states, the monitored wind conditions and optionally the operational states as input parameter set and returns control parameters mapped on the input.

The look-up table may be generated offline based on a wind park wake model which considers the influence of the floating motion effects as for example indicated in FIGS. 2-6. The control parameters stored in the look-up table are predetermined by the wind park wake model by identifying such setting of the control parameters of each wind turbine that the performance of the wind park is maximized, or the wake influence is minimized. The identifying may be based on an optimization algorithm optimizing the model output. More specifically, the lookup table may be generated by a site-specific configuration toolset that includes a model of the wakes in the wind park. Based on the model prediction, the control parameters, e.g., yaw offsets, are optimized for each condition (combination of the wind condition, e.g., wind direction, wind speed, and wind turbulence, and the floating motion state).

According to an alternative embodiment, the optimized control parameter for each turbine is generated based on a wind park wake model and an optimization algorithm and both of which are executed online on the wind park controller 190. Thus, the optimized control parameters are identified online (i.e., through model-based-optimization executed in each control setting update interval).

As a more specific example, a wake model of a floating wind turbine may take as input parameter combinations of inclinations and amplitudes of each of the floating motions indicated in FIG. 1 and input parameters related to wind conditions (inflow wind speed, direction and turbulence intensity) and the operational state, e.g., control settings or mode of activation. The wake model may capture the effect of the inclinations and the amplitudes of the motions on wake deflection, initial velocity deficit, and velocity deficit recovery. Deriving the control parameter may thus consider the effect which the floating motion of these wind turbines have on the wake and thus on the wake influence on one or more downstream wind turbines.

Identifying the control parameters online may be of further interest if the monitored floating motion state and/or the monitored wind condition comprise a high number of parameters which would increase the dimensions of the look-up table and hence would increase the memory requirements of such look-up table.

Generally, the model may be computationally efficient in order to allow quick optimization of the control parameter. This may be achieved by applying a parameter reduction or data binning to the input parameters of the model.

Further, the generated control parameter is a control parameter that is optimized to maximize the performance of the wind park by a wake control. Due to the optimized control parameters:

a) Less manipulation effort may be required to control the upstream wind turbine, e.g., a smaller blade pitch offset, or nacelle yaw offset in case there is a large floater heave, floater sway and floater roll motion which enhances the wake motion. A larger action may vice versa be required when such motion is reduced.

b) Less manipulation effort may be required on an upstream turbine if turbines move away from each other in a floater sway or floater surge direction, and vice versa a larger control action is required on an upstream turbine when turbines move towards each other.

c) Adapted control may be required in the case that wake deflection takes place due to floater pitch motion and floater yaw motion.

In summary, the control parameters induce a control of each wind turbine such that the wake influence in the wind park is reduced and therefore the power performance is maximized. The optimization allows precisely identifying such control parameters.

According to another embodiment, the input parameters that are taken by the online model or the look-up table (and the offline model from which the look-up table is derived) may be reduced to the most relevant parameters. The parameter reduction is performed in order to identify those parameters that have the greatest influence on the wake properties. Accordingly, the control system 190 may extract the most important information, e.g., from the output of the monitoring units, and abstract parameters that mostly influence the wake behavior (e.g., estimate amplitudes of the wind turbine motion in particular directions and use low-pass filtering to find time-averaged floater yaw and pitch inclination angles which influence the time-averaged wake deflection).

As mentioned above, the wind park controller 190 provides a control parameter 714 to each wind turbine. The control parameter 714 is received and processed/executed by the respective wind turbine controller via a control interface 715. Such interface 715 may as an example be an interface for a nacelle yaw offset which is added to a nacelle yaw reference variable in order to manipulate the nacelle yaw reference value of a respective nacelle yaw control. Other interfaces may be used. Particularly, such interface may be used which allows adjustments of the operational state of a wind turbine by manipulating signals within the existing control architectures of such wind turbine. Such interface may for example allow manipulating upstream wind turbines by a) a collective blade pitch or rotor speed offset to influence overall thrust of the rotor on the wind flow, in order to increase the wind speed of the wake, b) a collective blade pitch or rotor speed offset periodic variation (pulsing) in order to vary the overall thrust of the rotor, in order to increase the turbulence in the wake, which promotes mixing with the surrounding flow and thus recovery of the wake in order to reduce the velocity deficit at the downstream turbine, c) a nacelle yaw or nacelle tilt misalignment, deflecting and reducing the wake by changing the direction and magnitude of the thrust on the flow, d) using an individual blade pitch control to apply a yaw or tilt moment on the rotor, creating reaction forces on the flow in order to deflect the wake or promote mixing in the wake, and e) repositioning the floating wind turbine in the wind park.

It should be clear that repositioning the wind turbine needs a possibility to navigate the wind turbine. That may require that the wind turbine is equipped with mechanics, e.g., a motor driven underwater propeller, which allows such repositioning. Other additional hardware besides or alternatively to underwater propellers may be UAVs, mooring line actuators or the like. Blade pitch, nacelle yaw and generator torque may however also be used alternatively or additionally to move around the wind turbine.

Figure 8:
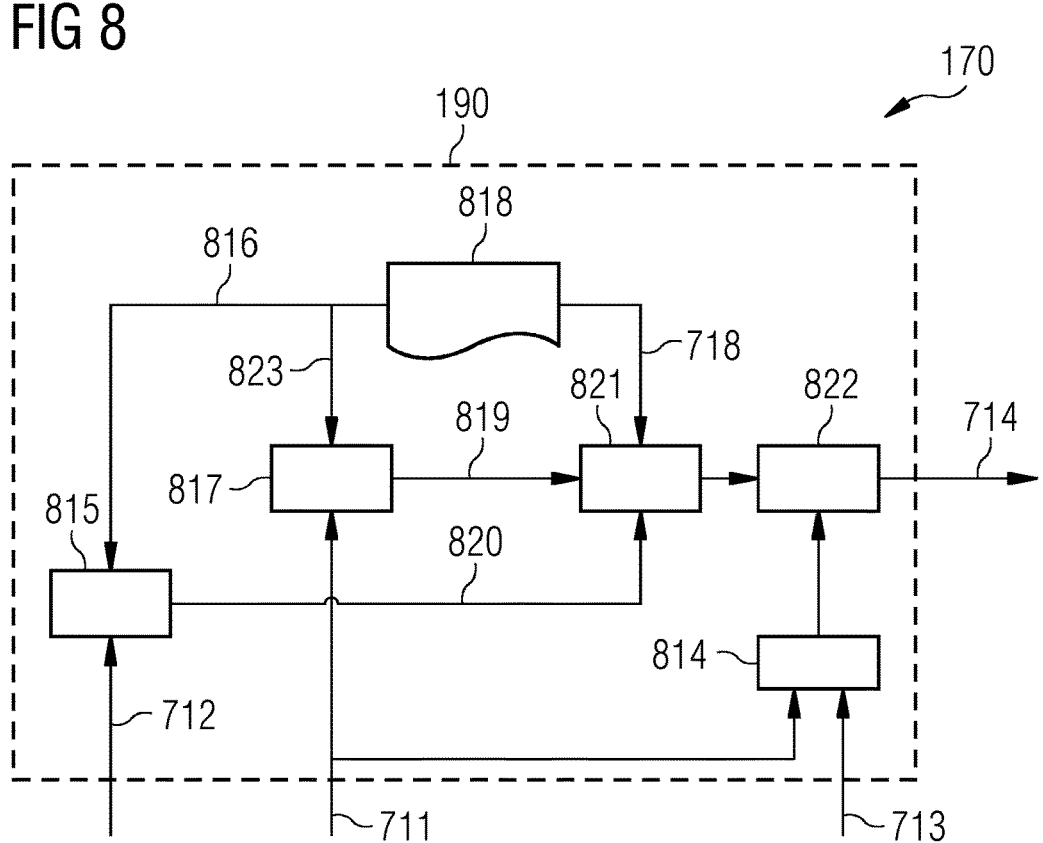
FIG. 8 is a schematic drawing showing a control system and a signal flow chart illustrating an operation of controlling wake according to an embodiment.

FIG. 8 is a schematic drawing showing the control system 170 and a signal flow chart illustrating an operation of controlling wake according to an exemplary implementation. The operation represented by the signal flow chart in FIG. 8 may be performed by the wind park controller 190. The shown operation derives the control parameter 714 for a single wind turbine. It should be clear that such operation may be performed correspondingly for the other wind turbines comprised by the floating wind park. The wind park controller 190 receives the monitored wind condition 711, the monitored floating motion state 712 and the monitored operational state 713 all of which are generated at the single wind turbine. Further, a predetermined park-specific configuration file 818 which may be stored at the memory unit of the wind park control system 190 provides floating motion state bin ranges 816, wind turbulence bin ranges 823 and the look-up tables 718 comprising predetermined control parameters specifically for the single wind turbine. A floating motion state bin index 820 is derived by floating motion state binning unit 815 from the floating motion state bin ranges 816 and from the monitored floating motion state 712, which may for example comprise a floater pitch, yaw and sway motion amplitude. The index 820 is derived by a multi-dimensional data binning and is indicative for a mapping of the multi-dimensional input 712 onto one of the provided bin ranges 816. The monitored wind condition 711 may for example comprise a monitored wind turbulence intensity, wind direction and wind speed. A wind turbulence bin index 819 is derived by wind turbulence binning unit 817 from the monitored wind turbulence intensity 711 and the wind turbulence bin ranges 823. The index 819 is derived by a single-dimension data binning and is indicative for a mapping of the single-dimensional turbulence intensity onto one of the provided bin ranges 823. The provided bin ranges 823 may for example be implemented such that the wind turbulence intensity may be mapped onto a low, mid or high turbulence level each of which is represented by a respective wind turbulence bin index 819. A multi-dimensional data binning may be applied if required. e.g., if the data binning is based on additional parameters comprised by the monitored wind condition 711. A look-up table selector 821 selects a look-up table from the provided look-up tables 718 based on both the index 819 and the index 820 and provides the selected look-up table to a multivariate interpolation unit 822. The control parameter 714 is interpolated at the multivariate interpolation unit 822 by a multivariate interpolation based on the selected look-up table and the input parameters thereof. The input parameters of the selected look-up table comprise parameters of the wind condition 711 and the operational state 713. The operational state 713 may for example comprise a blade pitch angle and a nacelle yaw angle. A portion of the parameters may optionally be further processed. e.g., low-pass filtered by a low-pass filtering unit 814. According to an embodiment, the input parameters of the selected look-up table comprise a low-pass filtered inflow wind direction, inflow wind speed, blade pitch angle and nacelle yaw angle that are generated by low-pass filtering the respective wind direction and wind speed comprised by wind condition 711 and the respective blade pitch and nacelle yaw angle comprised by the operational state 713.

Figure 9:
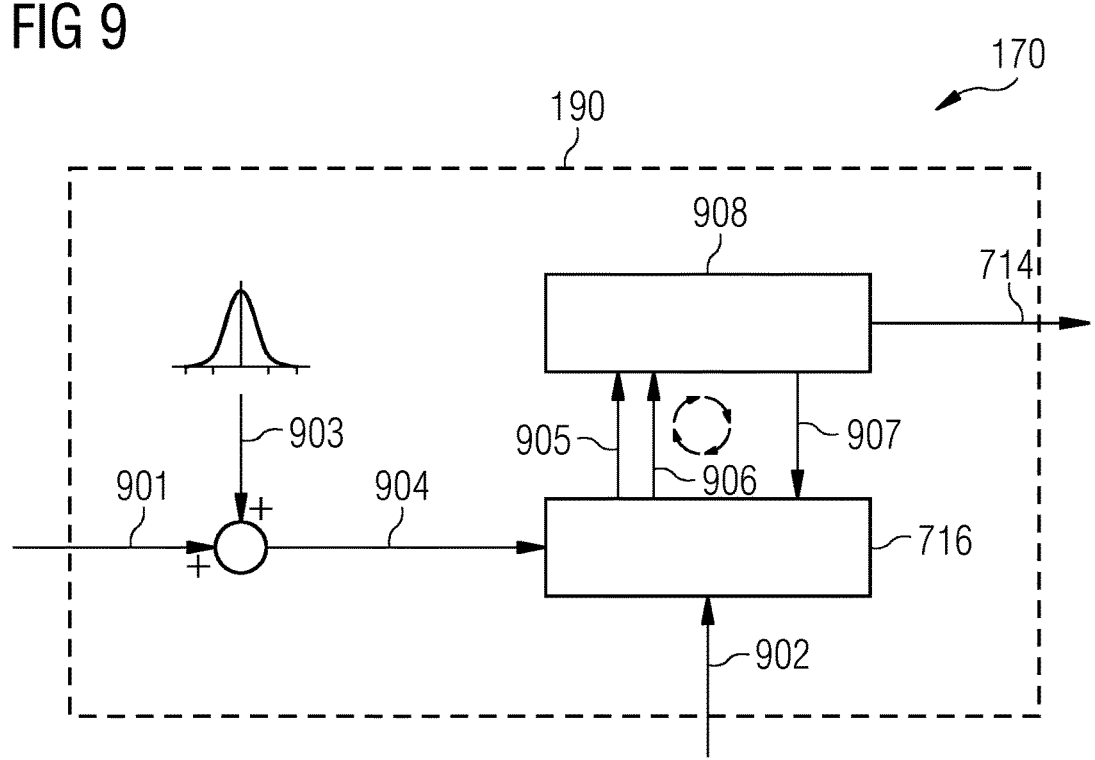
FIG. 9 is a schematic drawing showing a control system and a signal flow chart illustrating an operation of controlling wake according to an embodiment.

FIG. 9 is a schematic drawing showing the control system 170 and a signal flow chart illustrating an operation of controlling wake according to an embodiment. The operation represented by the signal flow chart in FIG. 9 may be performed by the wind park controller 190. The step of deriving efficient control parameters 714 is sensitive to input parameter uncertainties. An uncertainty in a measurement or a variation of a non-measurable motion may thus decrease the efficiency of the wake control. FIG. 9 shows hence an embodiment according to which the optimal control parameters are identified that maximize the expected value of the performance of the wind park assuming a range of possible values of an uncertainty affected input parameter 901. It should be clear that the expected value of the performance represents an overall performance of the wind park and that alternative representations of the overall performance may be implemented. The uncertainty affected input parameter 901 may be a parameter comprised by the monitored floating motion state. e.g., a floater inclination, displacement or amplitude, and/or a parameter comprised by the monitored wind condition. e.g., a monitored wind direction, and/or a parameter comprised by the monitored operational state. A range of input parameter values 904 is derived from a sum of the uncertainty affected input parameter 901 and an uncertainty affected input parameter error distribution 903. The error distribution may for example be a Gaussian distribution which may be determined empirically. The range of input parameter values 904, other input parameters 902 and initial control parameters/control parameters of the actual iteration step 907 are input to the wind park model 716. The wind park model 716 is the wind park wake model that predicts the wake in the wind park. Based on its inputs, the wake park model 716 generates an expected value of the wind park performance 905 and a gradient of the wind park performance 906 both of which are processed iteratively by iterative optimization unit 908 in order to maximize the expected value 905. The iterative optimization unit 908 generates in each step the control parameters 907. e.g., a yaw offset for each wind turbine of the wind park, until an optimization stop criterion is met. When the optimization stop criterion is met, the iterative optimization unit 908 has identified the optimal control parameters 714 that consider the uncertainty of the input parameter 901. The control parameters 714 are output.

Such operation increases the robustness of the control against input parameter uncertainties. The operation may be performed online or offline. The operation may be performed offline to predetermine a plurality of sets of control parameters to be stored in a look-up table that is responsive to all possible combinations of input parameters. Or alternatively, the operation may be performed online to identify a single set of control parameters in response to actual input parameters during the operation of the wind park. It should be clear that the uncertainty of a plurality of input parameters may be considered correspondingly by the iterative optimization unit 908.

Figure 10:
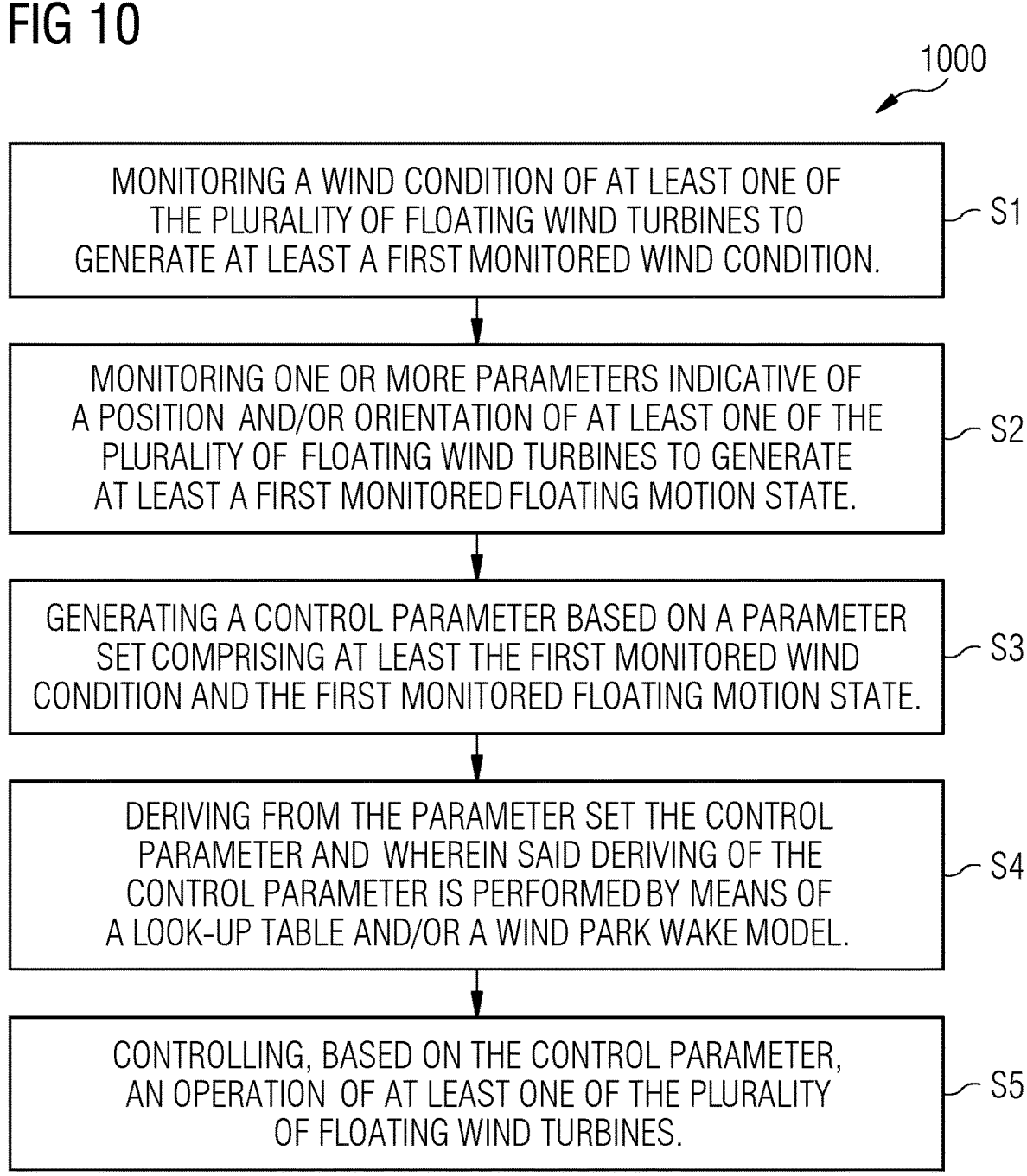
FIG. 10 is a schematic flow diagram illustrating a method of controlling wake according to an embodiment.

FIG. 10 is a schematic flow diagram illustrating a method 1000 of controlling wake according to an embodiment. The sequence of the method steps in FIG. 10 is not limited to the shown sequence. In embodiments, the method is further not limited to the shown number of steps. Certain steps of the method may not be carried out, may be replaced or extended. According to a step S1 of the method 1000, a wind condition at at least one of the plurality of floating wind turbines is monitored to generate at least a first monitored wind condition. Further, one or more parameters indicative of a position and/or orientation of at least one of the plurality of floating wind turbines is monitored to generate at least a first monitored floating motion state (step S2). A control parameter is generated in step S3 based on a parameter set comprising at least the first monitored wind condition and the first monitored floating motion state. The control parameter is derived from the parameter set, wherein the deriving considers an influence of floating motion parameters of an upstream wind turbine on the wake of the upstream wind turbine and considers an effect of the wake of the upstream wind turbine on a downstream wind turbine, wherein the control parameter is derived so as to reduce the wake influence on the downstream wind turbine. Further, the control parameter is derived in step S4 from the parameter set and the deriving of the control parameter is performed by a look-up table and/or a wind park wake model. An operation of at least one of the plurality of floating wind turbines is controlled based on the control parameter in step S5.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling wake in a floating wind park, wherein the floating wind park comprises a plurality of floating wind turbines that can change position and/or orientation during operation, the plurality of floating wind turbines comprising an upstream wind turbine and a downstream wind turbine, wherein the downstream wind turbine is positioned downstream of the upstream wind turbine such that a wake of the upstream wind turbine has an influence on the downstream wind turbine, the method comprising:
monitoring a wind condition at at least one of the plurality of floating wind turbines to generate at least a first monitored wind condition;
monitoring one or more parameters indicative of a position and/or orientation of at least one of the plurality of floating wind turbines to generate at least a first monitored floating motion state, wherein the first monitored floating motion state comprises parameters indicative of a floating motion of the at least one floating wind turbine;
generating a control parameter based on a parameter set comprising:
at least the first monitored wind condition and the first monitored floating motion state,
wherein the control parameter is derived from the parameter set, wherein the deriving considers an influence of floating motion parameters of an upstream wind turbine on the wake of the upstream wind turbine and considers an effect of the wake of the upstream wind turbine on a downstream wind turbine, and
wherein the control parameter is derived so as to reduce the wake influence on the downstream wind turbine, and
controlling, based on the control parameter, an operation of at least one of the plurality of floating wind turbines.

2. The method of claim 1, wherein the at least one floating wind turbine for which the first monitored floating motion state is generated is the upstream wind turbine and the at least one wind turbine for which the first monitored wind condition is generated is the upstream wind turbine, and wherein the method further comprises
monitoring a second floating motion state and a second wind condition at the downstream wind turbine in order to generate a second monitored floating motion state and a second monitored wind condition,
wherein the second monitored floating motion state and the second monitored wind condition are comprised by the parameter set.

3. The method of claim 1,
wherein monitoring the wind condition comprises monitoring one or more wind parameters that are representative of at least one of an inflow wind direction, a wind turbulence and a wind speed, and/or
wherein monitoring the floating motion state comprises monitoring one or more motion parameters that are representative of a translational motion in at least one direction and/or an angular motion about at least one angle of rotation,
wherein the at least one direction is selected from a floater surge direction, a floater sway direction and a floater heave direction, and wherein the at least one angle is selected from a floater yaw angle, a floater roll angle and a floater pitch angle.

4. The method according to claim 1, wherein the monitored floating motion state is indicative of a dynamic motion of the at least one wind turbine, wherein the monitored floating motion state comprises an amplitude and/or a frequency of a translational motion and/or an angular motion of the at least one wind turbine, wherein the amplitude and/or frequency is derived from a time series of the one or more monitored parameters.

5. The method according to claim 1, wherein the parameter set is reduced to a reduced parameter set, wherein the parameters of the reduced parameter set have a greater influence on a performance of the wind park than at least one parameter that is not comprised by the reduced parameter set, and wherein the control parameter is generated based on the reduced parameter set.

6. The method according to claim 1, wherein the deriving of the control parameter from the parameter set is performed by a look-up table and/or a wind park wake model.

7. The method of claim 6, wherein the look-up table is a predetermined look-up table obtained based on a wind park wake model, the look-up table being configured to provide for each composition of the parameter set a control parameter that minimizes the wake influence in the wind park for the respective parameter set.

8. The method according to claim 6, wherein generating the control parameter is based on the look-up table and the method further comprising:
approximating the control parameter if a parameter of the parameter set input to the look-up table comprises an intermediate value between two predefined values of the lookup table,
wherein the approximating comprises applying an interpolation and more applying a multivariate interpolation.

9. The method according to claim 6, wherein generating the control parameter is based on the look-up table and wherein the parameter set comprises an uncertainty affected parameter an actual value of which is associated with a parameter uncertainty, and wherein the look-up-table has been generated based on the wind park wake model such that a control parameter is generated that maximizes an expected value of the performance of the floating wind park when assuming a range of possible values for the uncertainty affected parameter based on the actual value of the parameter and a parameter that is representative of the parameter uncertainty.

10. The method according to claim 6, wherein generating the control parameter is based on the wind park wake model and wherein the wind park wake model is configured to provide for each composition of the parameter set a control parameter that maximizes wind park performance by reducing the wake influence in the wind park for the respective parameter set.

11. The method according to claim 6, wherein generating the control parameter is based on the wind park wake model and wherein the parameter set comprises at least an uncertainty affected parameter an actual value of which is associated with a parameter uncertainty, the method further comprising:

deriving a range of possible values for the uncertainty affected parameter based on the actual value of the parameter and a parameter that is representative of the parameter uncertainty,
wherein the control parameter is generated based on the range such that the control parameter maximizes an expected value of the overall performance of the wind park.

12. The method according to claim 1, wherein the floating motion state comprises at least one of a floater heave amplitude, a floater heave displacement, a floater surge amplitude, a floater surge displacement, a floater sway amplitude, a floater sway displacement, a floater roll amplitude, a floater roll inclination, a floater pitch amplitude, a floater pitch inclination, a floater yaw amplitude, a floater yaw inclination.

13. The method according to claim 1,
wherein the control parameter comprises at least a command to adjust at least one of a blade pitch of the at least one floating wind turbine, a rotor speed of the at least one floating wind turbine, a nacelle yaw angle of the at least one floating wind turbine, and/or
wherein the at least one floating wind turbine comprises a rotor and the control parameter comprises at least a command to apply at least one of a tilt moment on the rotor and a yaw moment on the rotor, and/or
wherein the at least one floating wind turbine is positioned at a location and the control parameter comprises a command to reposition the location of the at least one floating wind turbine.

14. The method according to claim 1, wherein the method further comprising:
data binning at least a portion of the parameter set, wherein a result of the data binning is comprised by the parameter set, and
wherein the data binning comprises mapping the monitored floating motion state onto a floating motion state bin range, and/or mapping the monitored wind condition onto a wind condition bin range.

15. A control system for controlling wake in a floating wind park, wherein the wind park comprises a plurality of floating wind turbines that can change their position and/or orientation during operation, the plurality of floating wind turbines comprising an upstream wind turbine and a downstream wind turbine, wherein the downstream wind turbine is positioned downstream of the upstream wind turbine such that a wake of the upstream turbine has an influence on the downstream wind turbine, the control system comprising a processing unit configured to perform a method comprising:
monitoring a wind condition at at least one of the plurality of floating wind turbines to generate at least a first monitored wind condition;
monitoring one or more parameters indicative of a position and/or orientation of at least one of the plurality of floating wind turbines to generate at least a first monitored floating motion state, wherein the first monitored floating motion state comprises parameters indicative of a floating motion of the at least one floating wind turbine;
generating a control parameter based on a parameter set comprising:
at least the first monitored wind condition and the first monitored floating motion state,
wherein the control parameter is derived from the parameter set, wherein the deriving considers an influence of floating motion parameters of an upstream wind turbine on the wake of the upstream wind turbine and considers an effect of the wake of the upstream wind turbine on a downstream wind turbine, and
wherein the control parameter is derived so as to reduce the wake influence on the downstream wind turbine, and
controlling, based on the control parameter, an operation of at least one of the plurality of floating wind turbines.

16. A computer program product, comprising a computer readable hardware storage device having computer readable program code stored therein, said program code executable by a processor of a computer system to implement a method of controlling wake in a floating wind park, wherein the floating wind park comprises a plurality of floating wind turbines that can change position and/or orientation during operation, the plurality of floating wind turbines comprising an upstream wind turbine and a downstream wind turbine, wherein the downstream wind turbine is positioned downstream of the upstream wind turbine such that a wake of the upstream wind turbine has an influence on the downstream wind turbine, the method comprising;
monitoring a wind condition at at least one of the plurality of floating wind turbines to generate at least a first monitored wind condition;
monitoring one or more parameters indicative of a position and/or orientation of at least one of the plurality of floating wind turbines to generate at least a first monitored floating motion state, wherein the first monitored floating motion state comprises parameters indicative of a floating motion of the at least one floating wind turbine;
generating a control parameter based on a parameter set comprising:
at least the first monitored wind condition and the first monitored floating motion state, wherein the control parameter is derived from the parameter set, wherein the deriving considers an influence of floating motion parameters of an upstream wind turbine on the wake of the upstream wind turbine and considers an effect of the wake of the upstream wind turbine on a downstream wind turbine, and
wherein the control parameter is derived so as to reduce the wake influence on the downstream wind turbine, and
controlling, based on the control parameter, an operation of at least one of the plurality of floating wind turbines.

* * * * *